United States Patent
Pignataro et al.

(10) Patent No.: US 10,262,014 B2
(45) Date of Patent: Apr. 16, 2019

(54) MACHINE DRIVEN COMMUNITY EXCHANGE OF MODULES FOR ISSUE MANAGEMENT

(71) Applicant: Cisco Technology, Inc., San Jose, CA (US)

(72) Inventors: Carlos M. Pignataro, Raleigh, NC (US); Joseph M. Clarke, Raleigh, NC (US); Gonzalo Salgueiro, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/496,150

(22) Filed: Apr. 25, 2017

(65) Prior Publication Data
US 2018/0307714 A1   Oct. 25, 2018

(51) Int. Cl.
G06F 11/14 (2006.01)
G06F 17/30 (2006.01)

(52) U.S. Cl.
CPC ...... *G06F 17/30312* (2013.01); *G06F 11/142* (2013.01); *G06F 2201/80* (2013.01); *G06F 2201/805* (2013.01); *G06F 2201/82* (2013.01)

(58) Field of Classification Search
CPC ......... G06F 11/0766–11/0793; G06F 11/3636; G06F 11/366; G06F 17/30312; G06F 2201/80
See application file for complete search history.

(56) References Cited

U.S. PATENT DOCUMENTS

| | | |
|---|---|---|
| 7,310,625 B2 | 12/2007 | Wu |
| 7,895,470 B2 | 2/2011 | Nastacio et al. |
| 8,799,230 B2 | 8/2014 | Pignataro et al. |
| 8,825,835 B2 | 9/2014 | Tetu |
| 9,020,949 B2 | 4/2015 | Pignataro et al. |
| 9,189,317 B1* | 11/2015 | Marimuthu ........... G06F 11/366 |
| 9,274,874 B1* | 3/2016 | Chamness ........... G06F 11/0709 |
| 9,354,964 B2 | 5/2016 | Channagiri et al. |
| 9,436,540 B2 | 9/2016 | Burugula et al. |
| 9,529,652 B2 | 12/2016 | Doppalapudi |
| 2009/0254391 A1 | 10/2009 | Sarkar et al. |
| 2016/0124957 A1 | 5/2016 | Rayes et al. |
| 2016/0132377 A1* | 5/2016 | Chamness ........... G06F 11/0709 714/37 |
| 2016/0357625 A1 | 12/2016 | Balakrishnan |

* cited by examiner

*Primary Examiner* — Joseph R Kudirka
*Assistant Examiner* — Indranil Chowdhury
(74) *Attorney, Agent, or Firm* — Edell, Shapiro & Finnan, LLC

(57) ABSTRACT

A community exchange gathers machine consumable modules in a centralized database. The community exchange receives information associated with the status of a computing device. One or more device tags are generated based on the first information. Each of the device tags is related to at least a portion of the status of the computing device. The community exchange stores a database of machine consumable modules in association with one or more existing tags. By cross-referencing the device tags with the existing tags, the community exchange determines whether one of the machine consumable modules is associated with the device tags. Responsive to a determination that no machine consumable module in the database is associated with the device tags, the information received from the computing device is stored as a machine consumable module associated with the device tags.

17 Claims, 7 Drawing Sheets

MACHINE DRIVEN COMMUNITY EXCHANGE OF MODULES FOR ISSUE MANAGEMENT

TECHNICAL FIELD

The present disclosure relates to sharing information between computing devices through a central repository of the information.

BACKGROUND

Issue tracking systems store static information units that relate to issues experienced by various computing devices. The information units (e.g., intellectual capital modules) may provide a path to resolve the issues experienced by a computing device. Typically, the issue tracking system enables a user, such as a customer support agent, to locate relevant information units by browsing in a hierarchical manner or by searching through tags and pointers associated with aspects of the issue. The user may then send any resolution/remediation stored in the appropriate information unit to resolve the issue on the computing device.

DESCRIPTION OF EXAMPLE EMBODIMENTS

Overview

Figure 1:
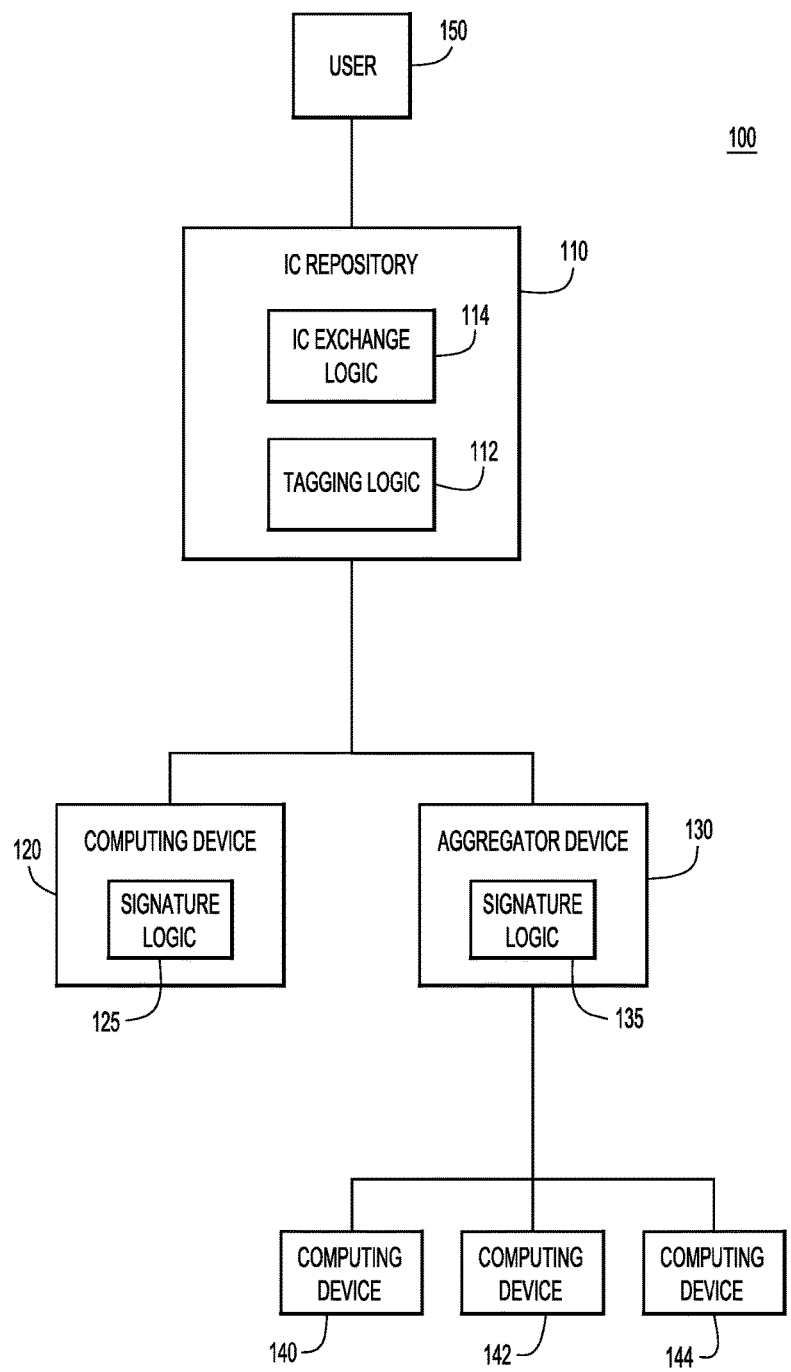
FIG. 1 is a simplified block diagram of a system for machine-to-machine communication of intellectual capital modules, according to an example embodiment.

In one embodiment, a computer-implemented method is provided for a community exchange device to gather machine consumable modules in a centralized database. The method includes receiving from a first computing device, first information associated with a status of the first computing device. One or more device tags are generated based on the first information. Each of the one or more device tags is related to at least a portion of the status of the first computing device. The method also includes storing a database of machine consumable modules. Each of the machine consumable modules is associated with one or more existing tags. By cross-referencing the one or more device tags with the one or more existing tags, the community exchange device determines whether one of the machine consumable modules is associated with the one or more device tags. Responsive to a determination that no machine consumable module in the database is associated with the one or more device tags, the first information received from the first computing device is stored as a machine consumable module associated with the device tags.

Detailed Description

The evolution of data-enabled and Intellectual Capital (IC)-enabled systems for tracking issues and customer interactions assumes that the data exchanged originates from an issue tracker interface, and is a static representation of the documentation. The techniques presented herein extend this paradigm to embed in computing devices the IC exchange connector and interface, such that a connected device may be directly part of the system of centralized issue tracking. In addition to embedding the IC exchange interface in the affected devices themselves, the IC exchange interface may be included in a computing device acting as a proxy (e.g., a fog computing device) on behalf of other computing devices (e.g., Internet of Things devices). The IC exchange may include executable code, diagnostic signatures, and other machine consumable structured IC modules that can be pushed to devices.

As described herein, the paradigm of the centralized issue tracking system extends along two vectors: 1) connected devices (or a fog node on behalf of a set of other devices) become part of the issue tracking system, via telemetry, and 2) the IC modules/issues being tracked and cross-linked include executable code.

In one aspect, the system presented herein may be considered as a community forum for exchanging IC between machines. Typically, community forums are used by humans to ask questions and create knowledge base articles (e.g., to document issues, best practices, tutorials, etc.). A community forum designed for human interaction will typically be laid out in a hierarchical manner that helps humans locate and group content in the forum. The system presented herein provides a similar IC exchange that is directly accessed by machines in a machine-to-machine, connected-device, and machine learning environment. In one example, the IC exchange system includes an Application Programming Interface (API)-based, web-enabled repository that is configured in a way that groups IC modules based on a flexible set of patterns instead of a static hierarchy. In other words, each IC module may include tags that allow machines to query the IC exchange system based on a flexible set of criteria (e.g., product, software, underlying technology, etc.).

Referring now to FIG. 1, a simplified block diagram of an IC exchange system 100 to provide a machine-to-machine exchange of machine consumable modules is shown. The IC exchange system 100 includes an IC repository 110 with tagging logic 112 and IC exchange logic 114. The tagging logic 112 enables the IC repository 110 to determine appropriate tags for individual IC modules stored in the IC repository 110. The IC exchange logic 114 enables the IC repository 110 to store IC modules and participate in the IC exchange system 100 as described herein. The IC repository 110 is connected to a computing device 120 that includes signature logic 125. The signature logic 125 enables the computing device 120 to describe its status in a machine consumable form. The IC repository 110 may also be connected to an aggregator device 130 (e.g., a fog computing node) with signature logic 135. The aggregator device 130 acts as a proxy on behalf of the additional computing devices 140, 142, and 144 to enable the IC exchange system 100 to incorporate IC from the additional computing device 140, 142, and 144. The signature logic 135 enables the aggregator device 130 to describe the status of each of the computing device 140, 142, and 144 and provide a signature of the statuses in a machine consumable form to the IC repository 110. A user 150 may also directly interact with the IC repository 110 to provide human expertise to IC modules stored in the IC repository 110.

In one example, computing devices (e.g., computing device 120 or aggregator device 130) contact the IC repository 110 based on a number of criteria. For instance, if a new feature, such as Border Gateway Protocol (BGP), is enabled on a network device (e.g., computing device 120), then the network device may contact the IC repository 110 and pose a query related to the best practices of BGP configuration for that particular model of network device. Based on this query, a machine-consumable IC module is returned by the IC repository 110 to the computing device 120. In this example, the IC repository 110 may return an IC module including configuration patterns on which to match (e.g., router model number, firmware version, etc.), and specific device configurations to apply according to best practices. If the configuration of the computing device 120 matches the configuration patterns in the IC module, then the computing device 120 will update its configuration according to the specific device configurations in the IC module to ensure optimal BGP operation in the computing device 120.

In another example, a device (e.g., computing device 120) or group of devices (e.g., computing devices 140, 142, and 144) may experience a problem and query the IC repository 110 based on the symptoms of the problem. If the device 120 is peering with other devices, and those peers are potentially related to the problem, then the device 120 may notify the other devices (e.g., via a publish/subscribe procedure, remote procedure call, etc.) to contact the IC repository 110 to gather their pieces of related IC modules to assist in identifying the problem and any potential remediation solutions. The format of these IC modules may be a diagnostic signature data model described hereinafter with respect to FIGS. 3A and 3B, such as Yet Another Markup Language (YAML), JavaScript Object Notation (JSON), eXtensible Markup Language (XML). The diagnostic signature document may contain data to identify a problem as well as remediation solutions.

In a further example, the IC exchange system 100 may provide a delivery and consumption exchange point for machine-consumable IC, such as Yet Another Next Generation (YANG) modules and/or executable code modules that a computing device may execute for a variety of different operational and support/troubleshooting scenarios.

Though FIG. 1 depicts a specific number of computing devices, aggregator devices, and users in the IC exchange system 100, the IC exchange system 100 may include other numbers of devices and/or users. Additionally, aspects of the logic implemented in the IC repository 110 (e.g., tagging logic 112) may be implemented in one or more of the computing devices (e.g., computing device 120).

Figure 2:
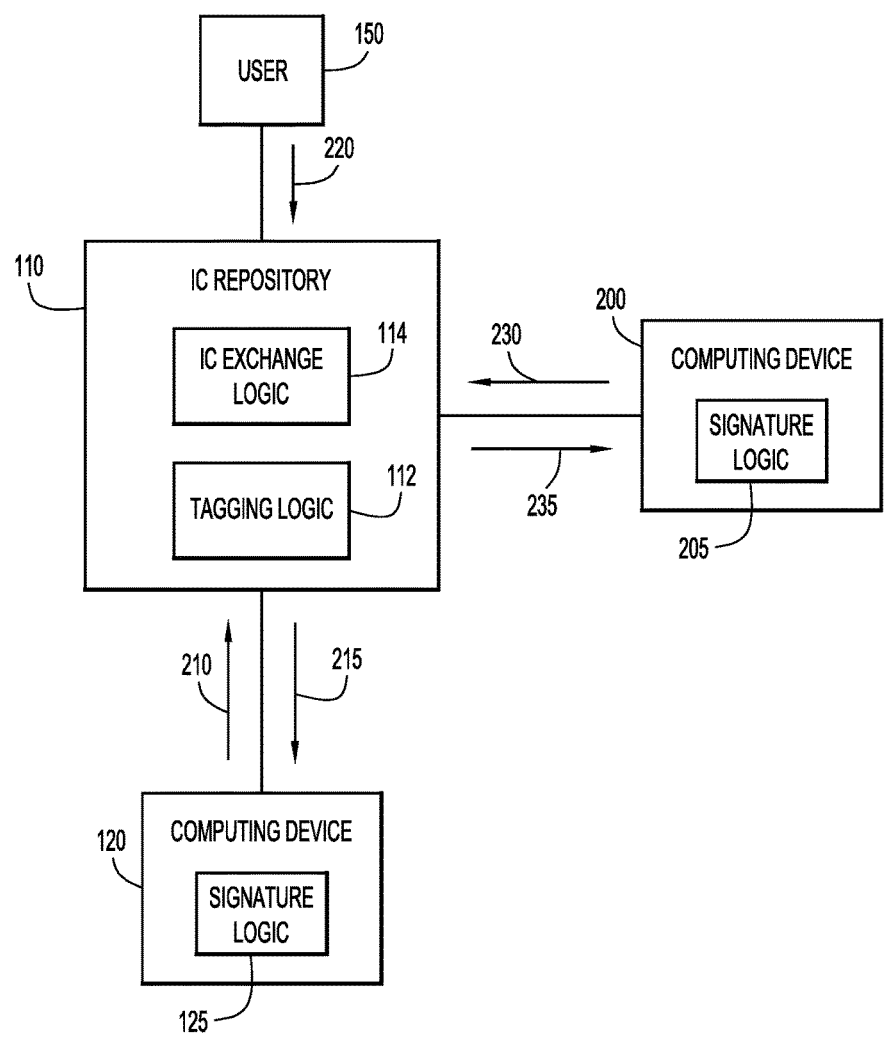
FIG. 2 is a simplified block diagram illustrating different interactions with the central repository of intellectual capital modules, according to an example embodiment.

Referring now to FIG. 2, a simplified block diagram of machines generating and exchanging an IC modules in an IC exchange system is shown. In addition to the computing device 120, the system shown in FIG. 2 includes a second computing device 200 with signature logic 205 connected to the IC repository 110. For ease of illustration, the computing device 200 is shown as a separate computing device in FIG. 2, but the computing device 200 may be the aggregator device 130 shown in FIG. 1. Each of the computing devices 120 and 200 may discover the identity of the IC repository 110 via typical discovery techniques (e.g., Web Finger, Domain Name Server, etc.).

When the computing device 120 encounters an incident, the computing device 120 connects to the IC repository 110 and sends a machine consumable query 210 to the IC repository 110 to determine whether the IC repository includes an IC module related to the incident. In one example, the query 210 includes a diagnostic signature generated by the signature logic 125 in the computing device 120. If the IC repository 110 has previously stored an IC module 215 that fits the criteria of query 210, then the IC repository 110 returns the IC module 215 to the computing device 120. The IC module 215 may include additional diagnostic signatures to confirm the incident, as well as potential remediation actions or executable code to resolve the incident.

If the IC repository 110 has not previously stored an IC module related to the incident described in query 210, then the IC repository generates a new IC module and stores the new IC module is association with the description of the incident provided in query 210. The query 210 may also include additional elements of the newly generated IC module, such as descriptive tags and potential remediation actions. Additionally, the user 150 may access the new IC module and provide additional machine consumable information 220 to save as part of the IC module. Alternatively the user 150 may provide the machine consumable information 220 to initially generate an IC module, which may be updated through interaction with the computing device 120. In this way, the new IC module may be built through either machine interaction (i.e., from computing device 120) or human interaction (i.e., from user 150) or both.

When the computing device 200 detects a similar incident, the computing device 200 sends a query 230 to the IC repository 110 that describes the incident. The IC repository 110 has stored an IC module 235 related to the incident, such as the IC module 215 as potentially modified by the user input 220 from the user 150. The IC repository sends the IC module 235 to the computing device 200. Additionally, the IC repository 110 may add any tags associated with the computing device 200, which may be different than the tags associated with the computing device 120 or tags added by the user 150. For instance, the computing devices 120 and 200 may be different model routers, such that the IC module 215 only includes the tags associated with the model of computing device 120. Once the IC repository 110 determines that the computing device 200 is affected by the same incident (e.g., by receiving the query 230), then a tag associated with the model of the computing device 200 may be added to the IC module 215 to generate the IC module 235. Additional computing devices and/or users (not shown in FIG. 2) may continue to refine and update the IC module related to this incident.

In one example, the IC repository 110 receives case information (e.g., from a customer support session) on an issue from computing device 120. The case information determines, categorizes, and tags the issue as an IC module. In addition to typical case notes, the case information includes machine consumable structured information (e.g., YANG configuration, device telemetry, diagnostic signatures, executable code modules, etc.) from the device 120. The case information for the IC module may be gathered from a variety of input sources including an issue tracking system, the computing device 120, a distributed compute/fog node (e.g., aggregator device 130), and/or a controller.

In another example, the IC exchange system 100 may enable policy enforcement using the IC repository 110. The computing device 120 may proactively consume IC modules in response to trigger-based Service Level Agreements (SLAs) or policies (e.g., configuration, device, identity, performance, etc.). For instance, the computing device 120 may enter a particular well-defined state, hit a specific performance threshold (e.g., a specific interface throughput), or encounter a specific failure scenario (e.g., pre-defined system log or debug message) that triggers consumption of one or more specific IC modules that perform a variety of diagnostic tasks, remediation tasks, and/or configuration tasks.

Figure 3A:
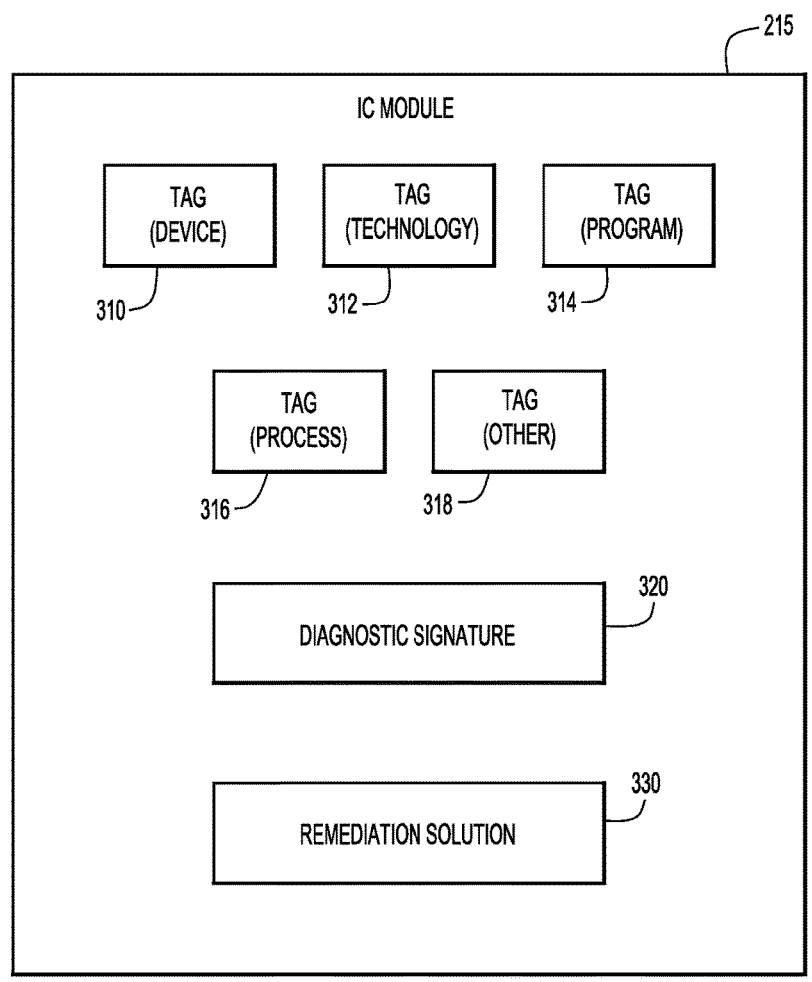
FIG. 3A is a block diagram of an intellectual capital module, according to an example embodiment.

Referring now to FIG. 3A, a representation of the IC module 215 is shown. The IC module 215 includes tags 310, 312, 314, 316, and 318, which describe the characteristics associated with the IC module 215. The tag 310 describes the device (e.g., router, laptop, internet phone, model number, firmware version, etc.) that is associated with the IC module 215. The tag 312 describes the underlying technology (e.g., BGP, Transport Control Protocol/Internet Protocol (TCP/IP), Voice over IP (VoIP), etc.) that is associated with the IC module 215. The tag 314 describes a specific program (e.g., email client, web browser, etc.) that is associated with the IC module 215. The tag 316 describes a specific process (e.g., Simple Network Management Protocol Daemon (SNMPD), encrypt/decrypt, etc.) that is associated with the IC module 215. The tag 318 describes another descriptive feature (e.g., user, configuration, etc.) that is associated with the IC module 215. The tags 310, 312, 314, 316, and 318 are intended to be illustrative of some of the types of tags that may be associated with an IC module, and other types of tags may be implemented. Additionally, an IC module may include multiple tags of the same type, such as multiple device tags 310 describing different devices that are associated with the IC module.

The IC module 215 also includes a machine consumable diagnostic signature 320 that enables a device to verify that the IC module 215 is appropriate for the situation that the device is currently experiencing. In one example, the diagnostic signature may be a logical expression combining one or more characteristics described by the tags 310, 312, 314, 316, and/or 318. For instance the diagnostic signature 320 specify that the IC module 215 is appropriate for a specific model of router that implements BGP. The diagnostic signature 320 may include a collection of one or more of the tags 310, 312, 314, 316, and 318. For instance, the diagnostic signature 320 may specify that the device is a particular model of router, which translates into a tag 310 with a value of that particular model of router.

The IC module 215 may also include a remediation solution 330 that enables a device to resolve the issue related to the IC module 215. In one example, the remediation solution 330 may include executable code or machine consumable configuration data that resolves the issue related to the IC module 215. In another example, the remediation solution 330 may include additional diagnostic procedures designed to provide a more detailed description of a problem encountered by the device. The additional description may be used to retrieve a second IC module that includes a more specific remediation solution for the problem. In other words, the remediation solution 330 may function to gather more information in order to better diagnose the problem, leading to a better remediation solution from another IC module.

Figure 3B:
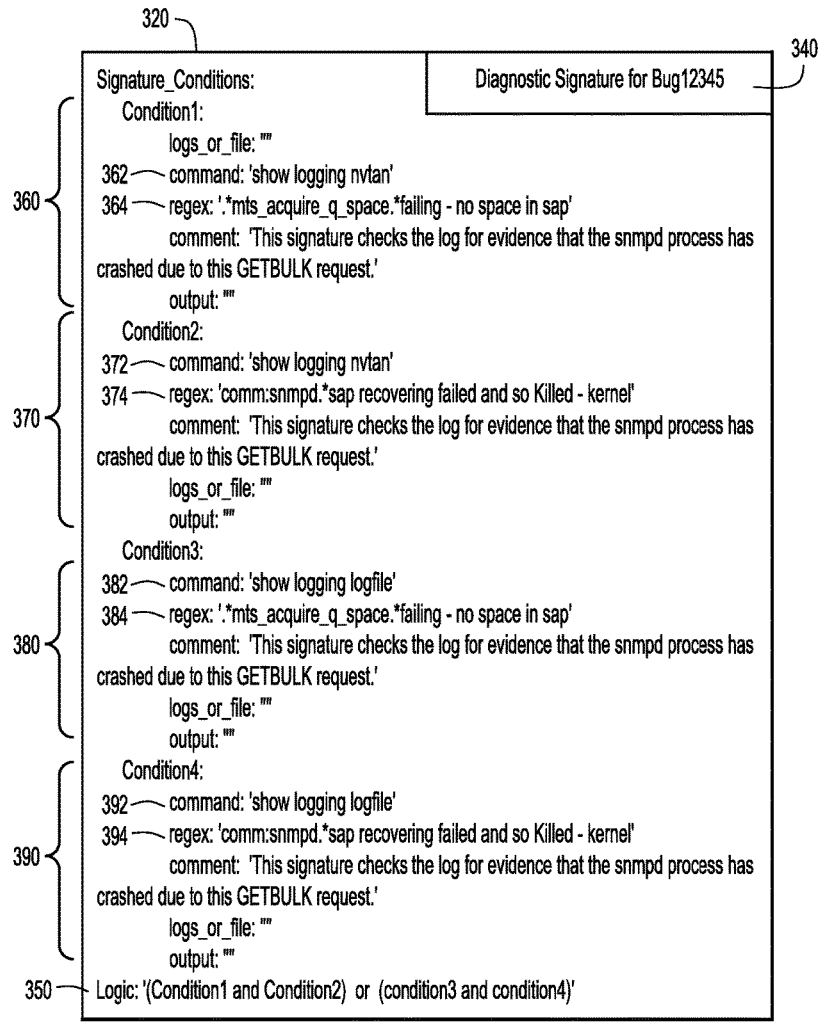
FIG. 3B is a block diagram of a diagnostic signature related to a specific issue, according to an example embodiment.

Referring now to FIG. 3B, an example of a diagnostic signature 320 is shown. The diagnostic signature 320 includes a description 340 of the issue addressed by the IC module associated with the diagnostic signature 320. The diagnostic signature 320 also includes a machine consumable logical expression 350 that a computing device can evaluate to determine whether the IC module associated with the diagnostic signature 320 is relevant to that computing device. The logical expression 350 includes a combination of conditions 360, 370, 380, and 390. The condition 360 includes a command 362 that may be run on a device to determine a status of the device. The condition 360 also includes a potential result 364 of the command 362, which indicates that the condition 360 is TRUE.

Similarly, the conditions 370, 380, and 390 include commands 372, 382, and 392, respectively that may be run on a device to determine different aspects of the status of the device. The conditions 370, 380, and 390 also include potential results 374, 384, and 394 to commands 372, 382, and 392, which indicate that the conditions 370, 380, and 390, respectively, are TRUE. Once each of the conditions 360, 370, 380, and 390 have been evaluated on the device, the overall logical expression 350 may be evaluated to determine if the diagnostic signature 320 matches the conditions of the device.

In one example with reference back to FIGS. 2, 3A, and 3B, a computing device 120 encounters a crash in the SNMPD process. The computing device 120 generates a crash signature 210 that reflects the status of the computing device 120 and sends the crash signature 210 to the IC repository 110. The IC repository 110 checks for IC modules that are related to the crash signature 210. For instance, the IC repository 110 may generate tags based on the crash signature 210 and cross-reference the tags from the crash signature with existing tags on stored IC modules. If an IC module 215 includes a matching tag (e.g., a process tag 316 with a value of SNMPD), then the IC repository 110 sends the IC module 215 to the computing device 120.

When the computing device 120 receives the IC module 215, the computing device 120 executes the machine consumable diagnostic signature 320 to confirm that the SNMPD crash experienced by the computing device 120 is caused by the issue described in the description 340 of the diagnostic signature 320. In other words, evaluating the diagnostic signature 320 on the computing device 120 confirms that the SNMPD crash was caused by issue in the description 340 (e.g., the Bug12345 bug). Once the computing device 120 confirms that the IC module 215 is relevant by evaluating the diagnostic signature 320, the computing device 120 can apply any remediation solution 330 included in the IC module 215 to overcome the crash of the SNMPD process.

In another example, a computing device 120 or user 150 may upload a leading practice to the IC repository 110. This leading practice is structured as a machine consumable configuration within an IC module. For instance, the IC module may include a machine consumable configuration of the best practices in deploying BGP in a router. Another computing device (e.g., computing device 200) may post its configuration (e.g., as a YANG modeled version) in order to optimize the configuration of the computing device 200 according to leading practices of the IC module.

In a further example, the IC repository may serve as an exchange point for autonomic configurations. If a device is configured to autonomically enable a feature, the device may use the IC repository to find the machine consumable configuration instructions for performing the autonomic configuration.

Figure 4:
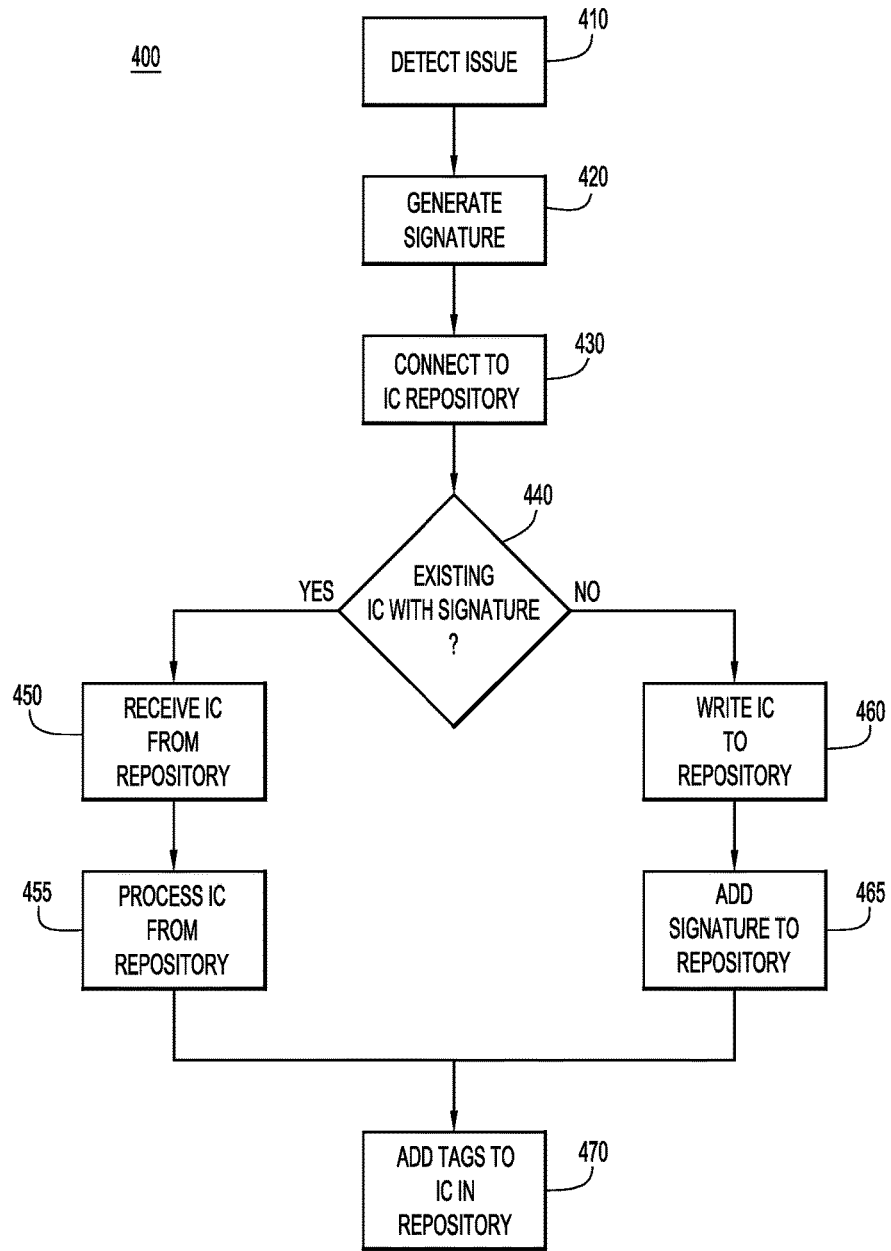
FIG. 4 is a flow chart illustrating the operations performed by a computing device in participating in the exchange of an intellectual capital module with the central repository, according to an example embodiment.

Referring now to FIG. 4, a flow chart is shown that illustrates operations performed by a computing device (e.g., computing device 120) in a process 400 for exchanging information with the IC repository 110. In step 410, the device 120 detects an issue with the operation of the device 120. In one example, the issue may be a crash or failure of a portion of the device. Alternatively, the issue may be a predetermined or machine learned state of the device 120. The issue detected in step 410 may be associated with the passage of a predetermined amount of time, i.e., the device 120 detects the "issue" every Saturday evening at midnight. In step 420, the device 120 generates a signature that reflects the status of the device 120. In one example, the device 120 generates a machine consumable signature that describes the status of the device 120 through a predetermined data model.

The device 120 connects to the IC repository 110 in step 430 to determine if the IC repository 110 has stored any IC modules that are relevant to the signature generated in step 420. If the IC repository 110 does have a matching IC module, as determined in step 440, then the device 120 receives the IC module from the IC repository 110 in step 450. The device 120 then process the IC module (e.g., evaluates the diagnostic signature and executes any remediation solution) in step 455. If the IC repository 110 does not have an IC module that matches the signature generated in step 420, as determined in step 440, then the device 120 writes a new IC module to the IC repository 110 in step 460. In step 465, the device 120 adds the signature generated in step 420 to the IC module generated in step 460.

Regardless of whether the device 120 received an IC module from the IC repository in step 450 or wrote a new IC module to the IC repository in step 460, the device 120 may add tags to the IC module in step 470. In one example, the tags are related to the configuration of the device 120 and further define the scope of relevance for the IC module.

Figure 5:
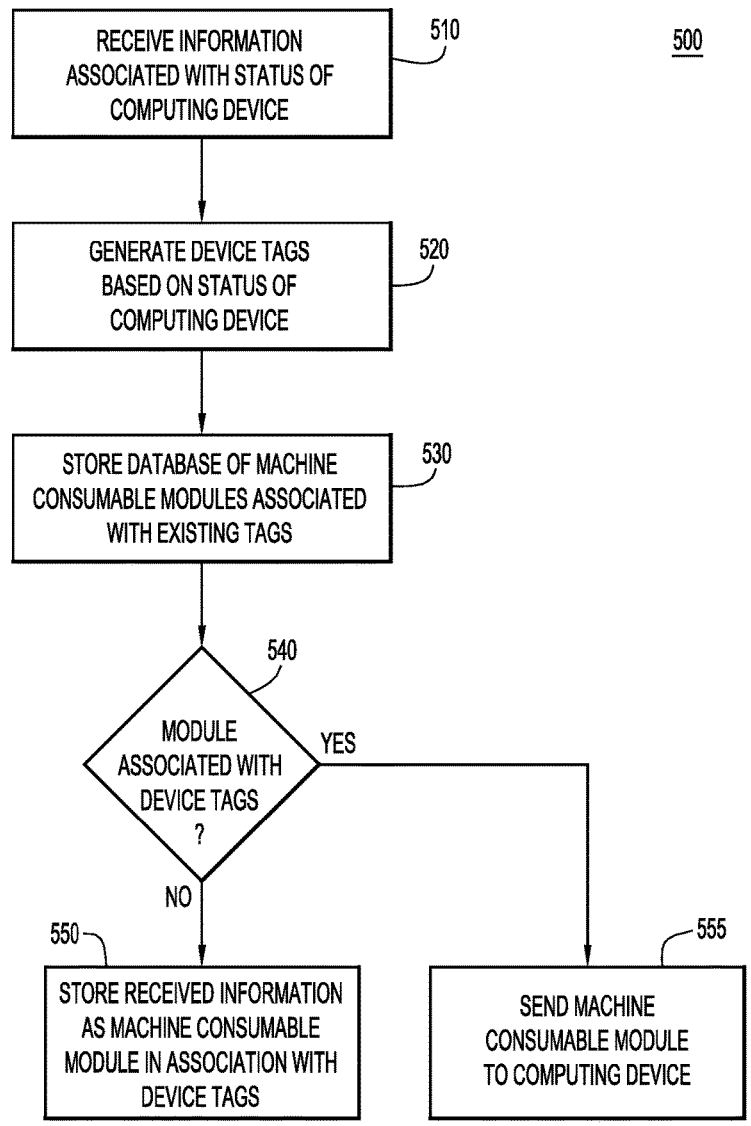
FIG. 5 is a flow chart illustrating the operations performed by the central repository in participating in the exchange of an intellectual capital module with a remote computing device, according to an example embodiment.

Referring now to FIG. 5, a flow chart is shown that illustrates operations performed by a machine consumable module exchange device (e.g., IC repository 110) in a process 500 for exchanging information with a computing device. In step 510, the exchange device receives information associated with the status of the computing device. In one example, the information includes machine consumable criteria that describe the status of the computing device when the computing device detected an issue in the computing device. In step 520, the exchange device generates device tags based on the information received form the computing device. In one example, the device tags are related to at least one portion of the status of the computing device.

In step 530, the exchange device stores a database of machine consumable modules. Each of the modules is associated with one or more existing tags. In one example, the exchange device gathers the machine consumable modules from other computing devices or users to maintain a comprehensive database of machine consumable modules each associated with one or more of the existing tags. In step 540, the exchange device cross-references the device tags generated in step 520 with the existing tags associated with the stored machine consumable modules to determine whether one of the machine consumable modules is associated with the device tags.

If the device tags do not match the existing tags of the IC modules stored in the database, as determined in step 540, then the exchange device stores the received information as new machine consumable module associated with the device tags in step 550. If the device tags do match the existing tags of a machine consumable module stored in the database, as determined in step 540, then the exchange device sends the machine consumable module to the computing device.

Figure 6:
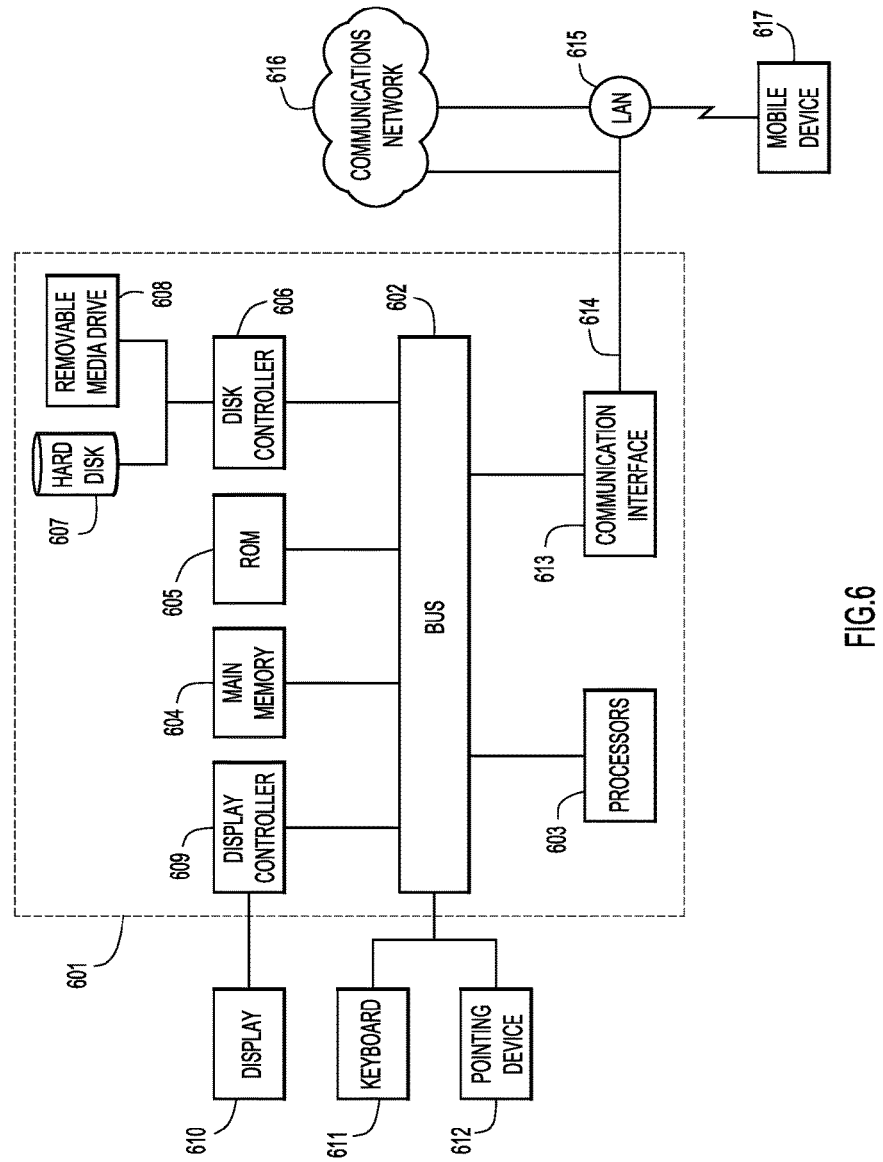
FIG. 6 is a simplified block diagram of a device that may be configured to perform methods presented herein, according to an example embodiment.

Referring now to FIG. 6, an example of a block diagram of a computer system 601 that may be representative of the IC repository 110 or computing device 120 in which the embodiments presented may be implemented is shown. The computer system 601 may be programmed to implement a computer based device, such as a community exchange for machine consumable modules in a machine-to-machine environment. The computer system 601 includes a bus 602 or other communication mechanism for communicating information, and a processor 603 coupled with the bus 602 for processing the information. While the figure shows a single block 603 for a processor, it should be understood that the processors 603 may represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive, solid state drive, etc.). The storage devices may be added to the computer system 601 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 601 may also include a display controller 609 coupled to the bus 602 to control a display 610, such as a cathode ray tube (CRT), liquid crystal display (LCD) or light emitting diode (LED) display, for displaying information to a computer user. The computer system 601 includes input devices, such as a keyboard 611 and a pointing device 612, for interacting with a computer user and providing information to the processor 603. The pointing device 612, for example, may be a mouse, a trackball, track pad, touch screen, or a pointing stick for communicating direction information and command selections to the processor 603 and for controlling cursor movement on the display 610. In addition, a printer may provide printed listings of data stored and/or generated by the computer system 601.

The computer system 601 performs a portion or all of the processing steps of the operations presented herein in response to the processor 603 executing one or more sequences of one or more instructions contained in a memory, such as the main memory 604. Such instructions may be read into the main memory 604 from another computer readable storage medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 601, for driving a device or devices for implementing the operations presented herein, and for enabling the computer system 601 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA), tablet computer, laptop computer, or cellular telephone.

In summary, the techniques presented herein provide for a community system for machine-to-machine interactions whereby devices can connect to consume intellectual capital directly. Multiple sources of input, such as different vendors of devices, can leverage the community exchange to allow the devices that interoperate and encounter an issue to connect to the community exchange and self-diagnose/troubleshoot the issue. The community exchange is designed for machine interaction, but may also accept input from human users to refine the machine consumable intellectual capital. The collection of intellectual capital modules stored in the community exchange may be extracted from support session or built directly. The intellectual capital modules are tagged and categorized to enable connecting devices to quickly identify relevant modules. The devices may periodically connect to the community exchange and download self-check intellectual capital modules that ensure the devices are properly configured. Additionally, upon encountering an issue in operation, a device may connect to the community exchange and search for self-diagnostics and/or self-remediations.

The techniques presented herein enable an organization to leverage customer data and intellectual capital that is unique to the organization, dynamically and with ubiquitous connectivity. Additionally, the techniques presented herein may extend an issue tracking system and interface into the devices encountering the issues, allowing for new degrees of automation, correlation, and collaboration.

In one form, a method is provided for a community exchange device to gather machine consumable modules in a centralized database. The method includes receiving from a first computing device, first information associated with a status of the first computing device. One or more device tags are generated based on the first information. Each of the one or more device tags is related to at least a portion of the status of the first computing device. The method also includes storing a database of machine consumable modules. Each of the machine consumable modules is associated with one or more existing tags. By cross-referencing the one or more device tags with the one or more existing tags, the community exchange device determines whether one of the machine consumable modules is associated with the one or more device tags. Responsive to a determination that no machine consumable module in the database is associated with the one or more device tags, the first information received from the first computing device is stored as a machine consumable module associated with the device tags.

In another form, an apparatus is provided comprising a network interface unit and a processor. The network interface unit is configured to receive, from a first computing device, first information associated with a status of the first computing device. The processor is configured to generate one or more device tags based on the first information. Each of the one or more device tags is related to at least one portion of the status of the first computing device. The processor is also configured to store a database of machine consumable modules. Each of the machine consumable modules is associated with one or more existing tags. The processor is configured to cross-reference the one or more device tags with the one or more existing tags to determine whether one of the machine consumable modules is associated with the one or more device tags. Responsive to a determination that no machine consumable module in the database is associated with the one or more device tags, the processor is configured to store the received first information in the database as a machine consumable module associated with the device tags.

In a further form, a non-transitory computer readable storage media is provided that is encoded with instructions that, when executed by a processor in a computer, cause the processor to receive, from a first computing device, first information associated with a status of the first computing device. The instructions also cause the processor to generate one or more device tags based on the first information. Each of the one or more device tags is related to at least one portion of the status of the first computing device. The instructions further cause the processor to store a database of machine consumable modules. Each of the machine consumable modules is associated with one or more existing tags. The instructions cause the processor to cross-reference the one or more device tags with the one or more existing tags to determine whether one of the machine consumable modules is associated with the one or more device tags. Responsive to a determination that no machine consumable module in the database is associated with the one or more device tags, the instructions cause the processor to store the received first information in the database as a machine consumable module associated with the device tags.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A computer-implemented method comprising:
   receiving, from a first computing device, first information associated with a status of the first computing device;
   generating one or more first device tags based on the first information, wherein each of the one or more first device tags is related to at least one portion of the status of the first computing device;
   storing a database of machine consumable modules, wherein each of the machine consumable modules is associated with one or more existing tags;
   cross-referencing the one or more first device tags with the one or more existing tags to determine whether one of the machine consumable modules is associated with the one or more first device tags;
   responsive to a determination that no machine consumable module in the database is associated with the one or more first device tags, storing the received first information in the database as a first machine consumable module associated with the one or more first device tags;
   receiving, from a second computing device, second information associated with a status of the second computing device;
   generating one or more second device tags, wherein each of the one or more second device tags is related to at least a portion of the status of the second computing device;
   determining which of the second device tags matches the first device tags;
   associating at least one of the second device tags that is different than the one or more first device tags with the first machine consumable module; and
   responsive to a determination that at least one of the one or more second device tags matches at least one of the one or more first device tags, sending the first machine consumable module to the second computing device.

2. The method of claim 1, further comprising sending to the first computing device any machine consumable modules in the database that are associated with the one or more first device tags.

3. The method of claim 1, wherein the first information is received in response to an incident at the first computing device, and wherein at least one of the one or more first device tags composes a signature of the incident.

4. The method of claim 3, wherein the incident at the first computing device is a specific failure scenario of the first computing device, and the signature comprises one or more system logs or debugging messages associated with the specific failure scenario.

5. The method of claim 4, further comprising:
   sending to the first computing device one or more corrective machine consumable modules associated with the first device tags in the signature of the specific failure scenario, wherein the one or more corrective machine consumable modules cause the first computing device to perform one or more diagnostic, remediation, or configuration tasks.

6. The method of claim 5, further comprising:
   receiving additional diagnostic information from the first computing device based on the one or more corrective machine consumable modules being executed on the first computing device;
   generating additional first device tags based on the additional diagnostic information; and responsive to a determination that the database includes one or more additional machine consumable modules associated with the additional first device tags, sending the one or more additional machine consumable modules to the first computing device.

7. The method of claim 1, wherein the one or more first device tags are associated with the first machine consumable module subsequent to the first information being stored in the database as the first machine consumable module.

8. An apparatus comprising:
a network interface unit configured to receive, from a first computing device, first information associated with a status of the first computing device; and
a processor configured to:
generate one or more first device tags based on the first information, wherein each of the one or more first device tags is related to at least one portion of the status of the first computing device;
store a database of machine consumable modules, wherein each of the machine consumable modules is associated with one or more existing tags;
cross-reference the one or more first device tags with the one or more existing tags to determine whether one of the machine consumable modules is associated with the one or more first device tags;
responsive to a determination that no machine consumable module in the database is associated with the one or more first device tags, store the received first information in the database as a first machine consumable module associated with the one or more first device tags;
receive from a second computing device via the network interface unit, second information associated with a status of the second computing device;
generate one or more second device tags, wherein each of the one or more second device tags is related to at least a portion of the status of the second computing device;
determine which of the second device tags matches the first device tags;
associate at least one of the second device tags that is different than the one or more first device tags with the first machine consumable module; and
responsive to a determination that at least one of the one or more second device tags matches at least one of the one or more first device tags, cause the network interface unit to send the first machine consumable module to the second computing device.

9. The apparatus of claim 8, wherein the processor is further configured to cause the network interface unit to send to the first computing device any machine consumable modules in the database that are associated with the one or more first device tags.

10. The apparatus of claim 8, wherein the network interface unit receives the first information in response to an incident at the first computing device, and wherein at least one of the one or more first device tags compose a signature of the incident, and wherein the incident at the first computing device is a specific failure scenario of the first computing device, and wherein the signature comprises one or more system logs or debugging messages associated with the specific failure scenario.

11. The apparatus of claim 10, wherein the processor is further configured to cause the network interface unit to:
send to the first computing device one or more corrective machine consumable modules associated with the first device tags in the signature of the specific failure scenario, wherein the one or more corrective machine consumable modules cause the first computing device to perform one or more diagnostic, remediation, or configuration tasks.

12. The apparatus of claim 11, wherein the processor is further configured to:
receive, via the network interface unit, additional diagnostic information from the first computing device based on the one or more corrective machine consumable modules being executed on the first computing device;
generate additional first device tags based on the additional diagnostic information; and
responsive to a determination that the database includes one or more additional machine consumable modules associated with the additional first device tags, cause the network interface unit to send the one or more additional machine consumable modules to the first computing device.

13. One or more non-transitory computer readable storage media encoded with computer executable instructions operable to cause a processor in a computer to:
receive, from a first computing device, first information associated with a status of the first computing device;
generate one or more first device tags based on the first information, wherein each of the one or more first device tags is related to at least one portion of the status of the first computing device;
store a database of machine consumable modules, wherein each of the machine consumable modules is associated with one or more existing tags;
cross-reference the one or more first device tags with the one or more existing tags to determine whether one of the machine consumable modules is associated with the one or more first device tags;
responsive to a determination that no machine consumable module in the database is associated with the one or more first device tags, store the received first information in the database as a first machine consumable module associated with the one or more first device tags;
receive from a second computing device, second information associated with a status of the second computing device;
generate one or more second device tags, wherein each of the one or more second device tags is related to at least a portion of the status of the second computing device;
determine which of the second device tags matches the first device tags;
associate at least one of the second device tags that is different than the one or more first device tags with the first machine consumable module; and
responsive to a determination that at least one of the one or more second device tags matches at least one of the one or more first device tags, send the first machine consumable module to the second computing device.

14. The non-transitory computer readable storage media of claim 13, further comprising instructions operable to cause the processor to send to the first computing device any machine consumable modules in the database that are associated with the one or more first device tags.

15. The non-transitory computer readable storage media of claim 13, wherein the first information is received in response to an incident at the first computing device, and wherein at least one of the one or more first device tags compose a signature of the incident.

16. The non-transitory computer readable storage media of claim 15, wherein the incident at the first computing device is a specific failure scenario of the first computing device, and the signature comprises one or more system logs or debugging messages associated with the specific failure scenario.

17. The non-transitory computer readable storage media of claim 13, further comprising instructions operable to cause the processor to:
- send to the first computing device one or more corrective machine consumable modules associated with the first device tags in the signature of the specific failure scenario, wherein the one or more corrective machine consumable modules cause the first computing device to perform one or more diagnostic, remediation, or configuration tasks;
- receive additional diagnostic information from the first computing device based on the one or more corrective machine consumable modules being executed on the first computing device;
- generate additional first device tags based on the additional diagnostic information; and
- responsive to a determination that the database includes one or more additional machine consumable modules associated with the additional first device tags, send the one or more additional machine consumable modules to the first computing device.

* * * * *